3,100,740
INTERRUPTED STARCH HYDROLYSIS
Robert W. Bond, Darien, Conn., assignor to Corn Products Company, New York, N.Y., a corporation of Delaware
No Drawing. Filed July 17, 1961, Ser. No. 124,345
1 Claim. (Cl. 195—31)

This invention relates to a novel method of producing a highly concentrated dextrose solution by means of a glucogenic enzyme.

Dextrose has many uses and in most applications it is necessary that the dextrose be in aqueous solution. However, the solubility of dextrose at room temperature is only about 54 percent, and not only is the shipment of a solution which contains 46 percent of water uneconomical, but the solutions ferment or become moldy in a fairly short time if held at normal temperatures.

While corn syrups containing dextrose can be evaporated to approximately 80 to 82 percent solids to avoid fermentation problems and to avoid shipping of excessive amounts of water, the dextrose crystallizes from such materials when the dextrose content is above 40–42 percent, dry basis, thus creating difficulties in handling. Hence, it will be apparent that a solution which can be shipped at a high concentration, which will not crystallize, and yet contains a high potential concentration of dextrose would be very useful.

The object of the present invention is to provide a solution which can be stored or shipped at a high dry substance content, which will not be subject to fermentation or mold growth during shipment or storage, and which has a potential dextrose content remarkably higher than that at which the concentrated solution will be subject to crystallization.

I have discovered a new process for preparing dextrose liquors high in dextrose content which accomplishes the foregoing objects. The process comprises essentially two stages, first the preparation of a mixture of a glucogenic enzyme and a starch hydrolysate liquor, e.g., glucose sirups, having a density within the range of about 39 to 45.4 Bé. and a D.E. value within the range of about 9 to 70 percent. In such a mixture the enzyme will remain in the dormant state for substantial periods of time. The second stage involves further hydrolysis of the aforementioned hydrolysate. Upon dilution of the concentrated liquor to a suitable concentration and with sufficient temperature and time, the enzyme, e.g., glucamylase, will convert the hydrolysate to a higher content of dextrose, as desired. Thus, it is possible to add the enzyme to the hydrolysate in the amount required to give a desired D.E. value at a given time and temperature and ship the blend to the user who may, at any time he desires, further convert the hydrolysate to obtain a higher content of dextrose than originally present.

The amount of enzyme required to convert the higher molecular weight substances in the hydrolysate having a D.E. value within the range specified will be sufficiently small that no refining of the final dextrose liquor is required. This liquor may be prepared and used immediately at the location of the user.

The process of my invention is more economical than one involving the preparation of crystalline dextrose and shipping this to a customer who must then dissolve it to obtain a solution having the concentration he desires. To obtain a highly concentrated dextrose solution from crystalline dextrose, it is essential to heat the water and dextrose and this heating causes an increase in color of the solution. Moreover, there will be a considerable savings in the cost of labor since the dextrose is packed in bags and these must be transported, stored, opened and dumped. In large scale operations the savings in labor are readily apparent.

The starch hydrolysates which may be used in the practice of the invention should have a D.E. value within the range of about 9 to about 70 percent. The amount of enzyme and the type to be added to the starch hydrolysate at the density specified will be determined by the amount necessary to further convert the hydrolysate to the desired D.E. value.

When the user of the starch hydrolysate wishes to obtain a dextrose liquor with a higher concentration of dextrose, he simply dilutes the hydrolysate and adjusts the temperature to that at which the enzyme hydrolyzes the higher molecular weight materials most efficiently. The hydrolysate may be diluted to as low as 1 percent, dry substance, but the practical range is 20 to 60 percent, dry substance (10 to 30° Bé.).

The following examples will illustrate the manner in which my invention may be applied. They are for illustrative purposes only and are not to be construed as limiting my invention.

EXAMPLE I

This example shows that conversion of corn sirup having a D.E. value of 42 percent proceeds slowly at a high density, even at 60° C. Corn sirup (42 D.E.) at the densities shown below was treated with an *Aspergillus niger* enzyme preparation in amount equivalent to the number of units of glucamylase activity shown in Table I. The conversion was conducted at 60° C.

Table I

| Baumé of corn sirup | Enzyme dosage, units of glucamylase activity/100 g., dry substance | D.E. after 64 hours conversion |
|---|---|---|
| 42 | 28 | 53.5 |
| 42 | 21 | 50.5 |
| 42 | 14 | 47.6 |
| 30 | 14 | 87.1 |
| 18 | 14 | 92.0 |

EXAMPLE II

This example sets forth conversions of corn sirup at various dilutions and enzyme dosages and the results obtained. The enzyme preparations were derived from *Aspergillus niger*. The D.E. value of the corn sirup was 42 percent and the conversions were conducted at 60° C.

Table II

| Baumé of corn sirup | Enzyme dosage, units of glucamylase activity/100 g., dry substance | Conversion time, hrs. | | | |
|---|---|---|---|---|---|
| | | 24 | 48 | 72 | 96 |
| | | D.E. value | | | |
| 42 | 14 | | | 49 | |
|    | 21 | | | 52 | |
|    | 28 | | | 55 | |
| 30 | 14 | | | 87 | |
| 18 | 10 | 85 | 87 | 89 | 89 |
|    | 14 | 88 | 89 | 88 | 87 |
|    | 14 | | | 92 | |
|    | 14 | | | 92 | |
|    | 18 | 88 | 89 | 88 | 88 |
| 14 | 10 | 86 | 88 | 89 | 89 |
|    | 14 | 87 | 89 | 89 | 90 |
|    | 18 | 89 | 89 | 89 | 89 |

EXAMPLE III

Corn sirup having a D.E. value of 43 percent and a gravity of 42° Bé. was blended with *Aspergillus niger* glucamylase preparation in an amount equivalent to 14 units of glucamylase activity per 100 grams, dry substance. The blend except for one sample therefrom was stored at room temperature (25° C.) for 179 days. Periodically samples were withdrawn and the D.E. values thereon determined. After the D.E. values were determined the samples including the first mentioned were diluted to 18° Bé. and the glucamylase was allowed to convert the hydrolyzable material present. After dilution to 18° Bé., the pH of the samples was adjusted to 4.7 and 900 ml. of each sample (with no further enzyme added) heated to 60° C. and maintained at this temperature for 72 hours to allow the enzyme to act on the hydrolyzable material. The enzyme was then inactivated and the D.E. values determined on the samples. The results are set forth in Table III.

*Table III*

| Corn sirup and enzyme age of sample (Days) | D.E. value | |
|---|---|---|
| | Shelf sample,[1] percent | After saccharification, percent |
| Original | 43.0 | 91.5 |
| 14 | 47.3 | 92.1 |
| 42 | 48.9 | 92.6 |
| 179 | 56.6 | 92.7 |

[1] Room temperature.

The above data indicate no inactivation of the enzyme when it was mixed with corn sirup (42° Bé.) and held for 179 days at room temperature. Upon saccharifying (no additional enzyme added) at 60° C. for 72 hours there was produced a hydrolysate having a D.E. value as high as 92.7 percent. Saccharification proceeded slowly during the 179 days of storage of the undiluted sirup at room temperature; the D.E. value increased from 43 percent to only 56.6 percent.

I claim:

A process for preparing dextrose liquors high in dextrose content which comprises mixing an enzyme preparation having glucamylase activity and a starch hydrolyzate having a density within the range of 39° to about 45.5° Baumé and a D.E. value within the range of about 9 to about 70%, whereby the enzyme remains in a substantially dormant state; and thereafter, when it is desired to use the mixture, diluting said mixture to a concentration substantially less than 39° Baumé and allowing the enzyme to convert the high molecular weight material present in said hydrolyzate to dextrose.

References Cited in the file of this patent

UNITED STATES PATENTS

| | | |
|---|---|---|
| 2,567,000 | Wallerstein et al. | Sept. 4, 1951 |
| 2,822,303 | Campbell et al. | Feb. 4, 1958 |
| 2,873,193 | Cleland et al. | Feb. 10, 1959 |

OTHER REFERENCES

Jacobs: "The Chemistry and Technology of Food and Food Products," vol. III, Interscience Publishers Inc., New York, 1951 (page 2131).

UNITED STATES PATENT OFFICE
CERTIFICATE OF CORRECTION

Patent No. 3,100,740                          August 13, 1963

Robert W. Bond

It is hereby certified that error appears in the above numbered patent requiring correction and that the said Letters Patent should read as corrected below.

Column 1, line 42, for "45.4" read -- 45.5 --.

Signed and sealed this 25th day of February 1964.

(SEAL)
Attest:
ERNEST W. SWIDER                          EDWIN L. REYNOLDS

Attesting Officer                            Acting Commissioner of Patents